Patented Sept. 15, 1931

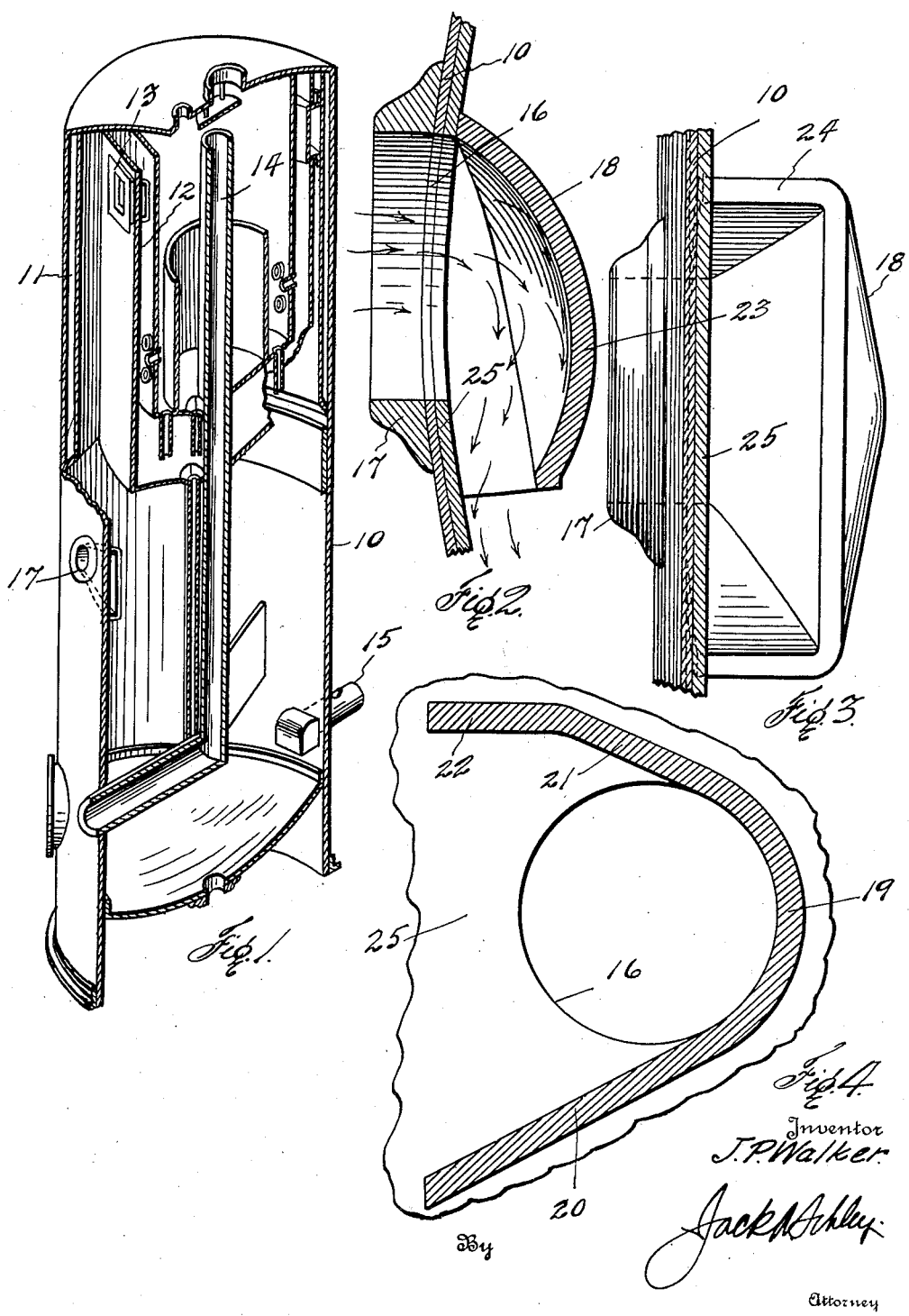

1,823,301

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

METHOD OF AND MEANS FOR SEPARATING AND FLOWING OIL AND GAS

Application filed March 19, 1928. Serial No. 262,954.

This invention relates to new and useful improvements in methods of and means for separating and flowing oil and gas.

One object of the invention is to provide a device for use in connection with an oil and gas separator, such as is shown in my Reissue Letters Patent No. 17,993, issued February 24, 1931, for directing circumferentially of the tank the flow of influent, and the present application also seeks to cover as a separate invention the nozzle and flow diverter set forth in the aforesaid patent.

Another object of the invention is to provide a device so designed and arranged as to spread the flow in a vertical plane, whereby an initial separation is carried out, thus causing the lighter fluids to be directed upwardly and the heavier fluids to be directed downwardly.

Another object of the invention is to provide a method of separating and flowing oil and gas wherein the influent or oil and gas mixture which flows from the well under pressure, is introduced into a container and abruptly turned back laterally onto the curved wall of the container at a point close to the inlet, whereby its direction of flow is changed so as to quickly liberate a major portion of the gas. At the same time primarily segregating the constituents of the influent according to their specific gravities and also at the same time directing the remaining fluids inclined path circumferentially of the container to spread in a thin film on the inner surface of the container wall to increase its surface travel and more efficiently scrub out the gas.

A further object of the invention is to provide a device arranged to induce a vertical expansion of the influent and also to retard the velocity thereof.

An important object of the invention is to provide a wear-plate mounted in the inner wall of the tank and to so form the diverter as to direct the main body of the influent against said plate, whereby sand and other foreign particles will be directed against said plate instead of wearing out the shell.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a conventional type of oil and gas separator equipped with a flow diverter constructed in accordance with the invention, Fig. 2 is an enlarged horizontal cross-sectional view, Fig. 3 is a view showing a front elevation of the diverter and illustrating the wall of the tank in vertical section, and Fig. 4 is a vertical sectional view taken on a plane substantially coincident with the inner wall of the tank.

In the drawings the numeral 10 designates the wall or shell of an oil and gas separator tank. The device of the invention is adapted to be mounted midway the height of the tank so as to give the lighter vapors and mist an opportunity to rise and to permit the liquids to flow circumferentially down the tank to the bottom thereof. The tank shown in Fig. 1 is merely an illustration and the invention is not to be limited in any way to such a tank. In general the tank has an annular channel 11 above the diverter and an interior shell 12 forming one side of the channel and provided with an inlet 13 in its upper end. A gas escape pipe 14 leads from the tank and an oil outlet 15 is arranged at the bottom.

At one or more points in the wall 10 of the tank inlet openings 16 are provided. These openings are arranged at the central portion of the tank with reference to its height and a suitable collar 17 is secured to the outer face of the tank wall so as to surround the opening, as is best shown in Fig. 2. This collar forms a coupling element for the pipe or other conductor (not shown) for the influent. While the collar is a convenience, it is not essential to the invention and any other coupling element might be used.

For directing the flow of the influent against the inner face of the wall 10 and circumferentially of the tank, I provide a diverter in the form of a hood 18. This hood surrounds and covers the opening 16 and has a rear curved portion 19 contiguous to said opening. From the portion 19 a flared wing 20 extends downwardly, while a flared wing 21 extends upwardly. The wing 21 is bent sharply into a forwardly directed portion 22.

The hood also includes a dome 23, which is merged into the wings and the curved end 19, as is shown in Figs. 2 and 3. The wings and hood are extended forwardly beyond the opening 16 and the hood is curved inwardly to form a restricted nozzle 24.

The opening 16 is surrounded by a wear-plate 25, particularly that portion underlying the front end of the diverter and extending forwardly therefrom. This plate is made of suitable metal and may be replaced when worn out. It is obvious that oil and gas flowing from a well will contain particles of sand, rock and other foreign matter. This flow often has an excessive pressure and a high velocity. The influent upon passing through the hole 16 will strike the curved dome 23 of the hood 18, whereby it will be directed forwardly toward the nozzle 24. This will cause the sand and other particles to be thrown against the wear-plate 25, which will protect the wall 10.

The restricted nozzle and the curved dome, together with the forward flare of the diverter, will somewhat retard the velocity of the influent, thus giving the same time to expand within the hood. The heavier fluids, such as the liquids, will gravitate downwardly toward the wing 20, while the lighter fluids, such as the gases and mist, will tend to rise and travel along the wing 21 and its flat portion 22, the latter acting as a baffle or deflector. By this arrangement the influent is given an initial separation within the diverter and consequently when the fluids are directed against the wall of the tank, they are automatically started on helical courses circumferentially of the tank and directed according to their specific gravities.

This is a particular advantage because the oils are started downwardly and the gases are started upwardly and the agitation within the tank is greatly reduced. The gases and mist readily rise in the channel 11 and seek to escape through the opening 13, rather than mixing with the liquids which flow downward in said tank. The retarding of the velocity of the influent is important, as is the diverting of the fluid, all of which makes for less agitation and better separation.

The method of separation involved in this invention is unique in that while it has been common practice to direct oil circumferentially on the inner surface of a curved wall, nowhere in the art of oil and gas separation has the influent been burned abruptly back onto the inner wall of the container at a point close to the inlet and at the same time spread into a thin film and its constituents primarily segregated according to their specific gravities. By changing its direction of flow and turning the influent abruptly back onto the wall of the container at a point close to the inlet, the major portion of the gas is quickly discharged or liberated, thus immediately getting it away from the flowing body of fluid. Then by spreading the oil in a thin film on the surface of the container at a point close to the inlet and directing it circumferentially, not only is the travel lengthened, but the surface scrubbing is so materially increased as to extract a much greater quantity of gas than is possible with the usual travel now common in separators.

The influent upon entering the diverter and particularly the head 18 has its direction of flow abruptly changed, this influent being under pressure and having considerable velocity will continue to flow around the container under sufficient velocity to carry out the scrubbing method. The pressure back of the influent as it comes from the well will maintain this required velocity irrespective of the abrupt turning. The sharp or abrupt turning back of the influent onto the inner wall of the container at a point close to the inlet not only spreads the oil in a thin film, but induces a primary segregation of the constituents, the heavier fluids such as liquids tending to flow downwardly and the lighter fluids such as gas and gaseous fluids tending to flow upwardly and the mixed fluids tending to take intermediate courses.

It is to be noted that the area of the discharge opening of the diverter is considerably larger than the inlet pipe opening through which the influent enters the tank.

Owing to the fact that gas is trapped or enclosed in the globules of oil and cannot be released until the oil skins or oil enclosures are broken, the most effective method of separation is to wear or scrub out the oil skins or enclosures, thus releasing the gas. It follows that the thinner the oil can be spread, the greater the number of globules which can be brought into contact with the surface of the container wall; also the longer the travel of the oil the more the globules can be rolled or scrubbed, and therefore the larger the number from which the gas can be released.

Contrary to the usual practice which is now common in many oil and gas separators, I do not depend upon or utilize to any great extent centrifugal force to hold the oil and gas mixture on the tank wall during the separation operation. The oil upon entering the tank is under more or less velocity and instead of directing the stream circumferentially within the tank and holding it on the surface thereof by centrifugal force, I mechanically turn said oil abruptly back onto the inner surface of the wall and immediately spread it in a thin film before it has started to flow around the tank. Owing to its viscosity, the oil when spread tends to adhere to the wall and its velocity and gravity are sufficient to carry the film in a circuitous path around the wall. The difference between centrifugal separation and separation by scrubbing or attrition is quite different and it is well known that the gas entrapped in oil is more efficiently released by scrubbing or attrition than it is by centrifugal separation.

I also mechanically direct the constituents of the oil and gas mixture in circumferential paths according to their gravities, thus directing the gaseous fluids upwardly and the liquids downwardly. I also avoid interrupting the path of the oil so that the latter will be given full opportunity to spread and travel a sufficient length to perform an adequate separation.

Various changes in the size and shape of the different parts, as well as modifications and alterations, may be made within the scope of the appended claims.

What I claim, is:

1. A flow diverter for an inlet to a fluid separator tank, including a body having oppositely flared wings and a curved dome connecting said wings at one side and forming a vertical nozzle at the discharge end of said wings, the curvature of said dome extending toward the tank wall at the nozzle to divert fluid into contact therewith and to spread the influent in a vertical plane to effect stratification within said body, the inlet and the nozzle being closely related, whereby the influent is abruptly diverted within the body of the dome, into contact with the tank wall, and quickly discharged from the nozzle to reduce the travel within the diverter body to a minimum.

2. A flow diverter for fluid separator tanks, including a partly spherical body having a concave inner face and an elongated vertically disposed nozzle open at one end and closed to the tank at the other end, said face being disposed to divert an influent into contact with the tank wall.

3. The combination in an oil and gas separator, of an upright tank having an influent inlet opening in its side wall, a curved wear plate attached to the inner surface of said tank wall and conforming to the curvature thereof, and a diverter covering the inlet opening and overhanging the wear plate and flared vertically from the inlet, said diverter acting to spread the influent vertically, said diverter also being formed to turn the influent into contact with the wear plate.

4. In an oil and gas separator for wells, the combination of an upright tank having an influent opening in its wall, a diverter on the inner side of said tank wall comprising a body having an elongated upright discharge opening at one end of greater area than the tank inlet opening and its other end covering and being opposite the tank inlet opening, said diverter body being connected to the tank wall and closed to the tank except at its discharge end, the body being vertically fan-shaped and turned laterally toward the tank wall in the direction of its discharge end for turning the influent back onto the tank wall at its discharge opening and for primarily segregating the constituents of the influent within the body of the diverter according to their specific gravities, whereby the gas is quickly liberated at a point close to the inlet and the remaining liquids are spread in a thin film beginning close to the inlet and are induced to flow circumferentially on the wall of the tank.

5. The combination in an oil and gas separator, of an upright tank having an influent inlet opening in its side wall, and a diverter on the inner side of said tank wall covering said opening, said diverter being closed at one end to the tank and open at its opposite end to discharge into the tank, the open end of the diverter being disposed vertically of the tank wall, said diverter being of short length and having a dome turned abruptly toward the inner surface of the tank wall for diverting the influent onto the wall of the tank at a point close to the inlet, whereby said influent is directed circumferentially of the tank and is immediately freed from the diverter close to the inlet to fully expand in the tank, and a wear plate on the inner surface of the tank onto which said influent is diverted by the diverter, said diverter overhanging the wear plate.

6. The method of separating oil and gas flowing from a well which consists in conducting the stream of oil and gas direct from the well into an upright tank, turning the stream abruptly back upon the upright inner surface of the tank immediately upon its entrance into the tank and co-incident therewith spreading the oil and gas in a vertical direction and thereby segregating the constituents of the stream according to their specific gravities, then directing the constituents in circumferential paths according to their gravities, carrying the gaseous fluids upwardly and spreading the oil in a thin film on the inner wall of the tank and carrying it in a long uninterrupted path over a wide area around said tank wall, whereby the surface contact of the oil globules is enhanced and the entrapped gas is scrubbed out.

In testimony whereof I affix my signature.

JAY P. WALKER.